June 25, 1957 L. E. GOODWIN 2,797,307
WELDING ELECTRODE HOLDER
Filed May 17, 1955 2 Sheets-Sheet 1

INVENTOR
LEOPOLD EDWARD GOODWIN
BY Oberlin & Limbach
ATTORNEYS.

INVENTOR
LEOPOLD EDWARD GOODWIN
BY
Oberlin + Limbach
ATTORNEYS.

2,797,307

WELDING ELECTRODE HOLDER

Leopold Edward Goodwin, Toorak, near Melbourne, Victoria, Australia

Application May 17, 1955, Serial No. 509,082

Claims priority, application Australia June 18, 1954

9 Claims. (Cl. 219—143)

This invention relates to a new and improved welding-electrode holder, that is to say, to a hand tool—for use by a welder—for holding a welding electrode.

The invention has been devised principally with the object of providing an improved electrode holder incorporating means whereby an electrode may be conveniently gripped and held by the holder or released as required.

It is known to provide welding electrode holders capable of being held in one hand and operable by a welder. Such electrode holders have means for gripping an electrode, means whereby an electric cable may be connected to the holder in such manner that electric current may be fed through the body of the holder to an electrode gripped in it, and an insulating handle. But the electrode holders as hitherto provided are so constructed that in order to remove the remnant of an electrode therefrom and/or to fit a new electrode into the holder it is necessary to employ both hands—one to hold the electrode holder and the other to operate the electrode gripping means. This is sometimes inconvenient. In addition, a third hand is required to hold the electrode to be placed in the holder, or else the electrode must be placed on a support—as a bench—so that one end projects therefrom and the electrode holder engaged with the electrode.

A further object of the invention is to provide an electrode holder, having means whereby an electrode may be conveniently picked up and held or released as required, wherein the means for gripping the electrode are operable by the hand in which the electrode holder is held.

Another object of the invention is to provide an electrode holder so designed and constructed as to provide for maximum convenience of operation.

In welding electrode holders as hitherto made it has been proposed to provide an insulating cover for the body of the electrode holder, so as to eliminate likelihood of the welder using the tool receiving electric shocks. However, such covers—being usually made of such insulating material as synthetic resin—are readily burned and when the last part of an electrode is being used, and the end of the insulating cover is close to the work, the end of the cover becomes damaged or burned due to the heat of the arc.

Yet another object is to provide, in a welding electrode holder, a reversible insulating cover for the body portion of the electrode holder, the cover being so made that if one end of it be damaged it may be reversed so that the opposite, or undamaged, end may be located at the operative end of the electrode holder.

The invention devised with these and other objects in view comprises, broadly, an electrode holder having a body member, a handle fitted to the body portion, and an electrode gripping member mounted within the body member, the electrode gripping member being operable by means of a trigger, or equivalent member, adapted to be actuated by the hand in which the handle is held.

The electrode-gripping member is preferably in the form of a pivoted member operable by a wedge member which is slidable in the body, the wedge member being spring loaded and being provided with a finger piece which may be conveniently gripped by a finger or fingers of the same hand in which the handle is gripped. The mechanism is so arranged that the movement of the operating means is limited and there may be provided means for adjusting the operating means so that it will be equally effective whether small or larger diameter electrodes are used in the electrode holder.

The body member has means whereby an electric cable may be connected to it, the handle and trigger means being insulated, and the electrode gripping member being connected electrically to the means for connecting a cable to the body member.

The invention also provides an insulating cover for the body member, said cover being so made that it may be readily reversed, end for end, relative to the body so that if the front end of the cover becomes burned or damaged the cover may be turned end for end and the rear or undamaged end may be placed at the front or operative end.

In order that the invention may be readily understood and conveniently put into practical form I shall now describe, with reference to the accompanying drawings a preferred construction of electrode holder made according to the invention. In these drawings.

Figure 1:
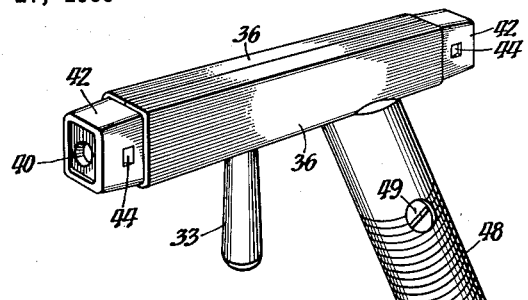
Fig. 1 is a perspective view, from the front, of the electrode holder.
Figure 2:
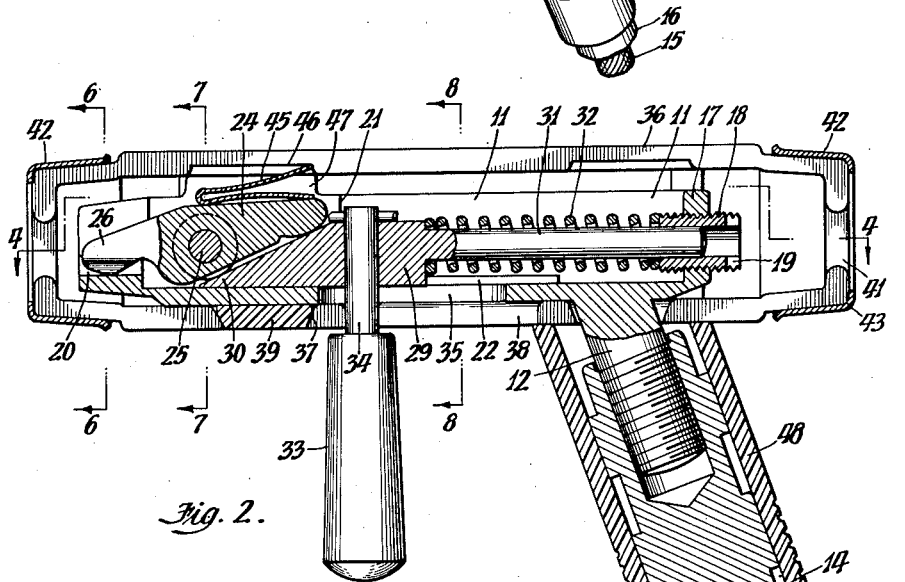
Fig. 2 shows a longitudinal cross-section through the electrode holders.
Figure 6:
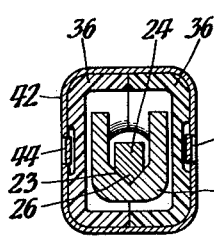
Figure 7:
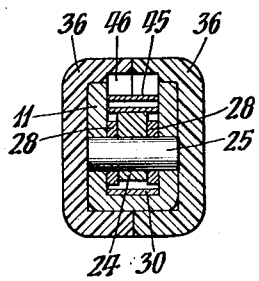
Figure 8:
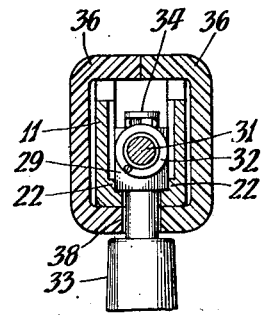
Figure 9:

Figs. 6, 7, and 8 are transverse cross-section views taken on the planes indicated by the lines, and in the direction of the arrows 6—6, 7—7 and 8—8 respectively of Fig. 2; and Fig. 9 is a perspective view of a plug which is fitted into the cover when assembled.

The body member 11 is of somewhat channel shape in transverse cross-section—see Figs. 6, 7 and 8—and it has a stem portion 12 formed integrally with and extending downwardly from its base or underside. To that stem 12 is securely fastened a boss 13 having in its outer end a hole 14 adapted to receive the end of a cable 15 on which is fitted a grommet 16. It is preferred that this grommet be so made that it may be readily removed when it becomes worn and replaced with a new grommet. The cable 15 is preferably sweated in position so as to ensure a good electrical connection. At the rear end of the channel shaped body member 11 is a wall 17 having an internally screw-threaded hole into which is fitted a ferrule 18 having opposed radial slots 19 at its outer end.

Figure 5:
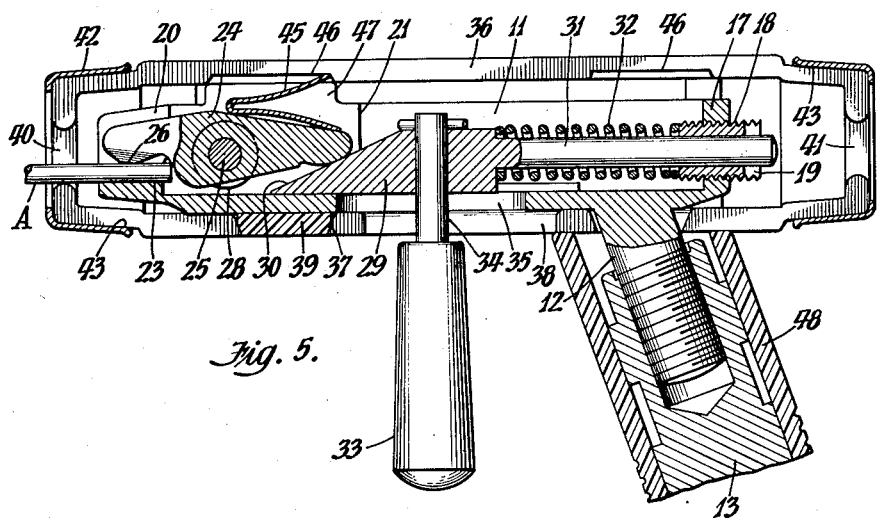
Fig. 5 shows a partial longitudinal cross-section through the holder, illustrating the parts when in gripping engagement with an electrode.

The front end portion of the body member 11 is constricted somewhat at 20 and the internal surfaces of the sides of the body 11 are shouldered at 21 so that the internal width of the body member between the shoulders 21 and the constriction 20 is less than the internal width rearwardly of the shoulders 21, and the internal width of the constricted front portion is less than that of the intermediate portion between the shoulders 21 and the constriction 20. Extending rearwardly of the shoulders 21 and upwardly from the base of the body 11 are opposite guides 22, the inner surfaces of which are substantially the same distance apart as the intermediate portion of the body 11 forwardly of the shoulders 21. The bottom of the constricted portion 20 is tapered to form a seating 23 for a welding electrode A—see Figs. 5 and 6.

This body member is made of metal which is a good electrical conductor—as a copper die cast alloy—so that electric current will be conducted freely from the cable 15 to the seating 23 for the electrode.

Near the front end of the body portion 11 is pivotally mounted the electrode gripping member 24. This electrode gripping member is pivoted upon a pin 25 fitted transversely through the body so that the electrode gripping member is located between the side walls of the channel. The electrode gripping member has a nose piece 26 adapted to bear upon the end of an electrode fitted within the front end portion of the channel—see Fig. 5—and it has a tailpiece 27 which extends rearwardly in the channel. Spacers 28 are fitted on the pin 25 on opposite sides of the electrode gripping member 24 so as to hold said member substantially centrally within the channel portion of the body.

The electrode-gripping member may be conveniently actuated by a slide 29 mounted in the body 11 and fitting between the guides 22. This slide 29 is of rectangular shape in cross-section and the front portion 30 of the slide is wedge-shaped, being so made that it normally fits beneath the tailpiece 27 of the electrode gripping member 24. When the slide 29 is moved forwardly the wedge-shaped front portion 30 runs beneath the tailpiece 27 and causes said gripping member 24 to turn pivotally in one direction in such manner that the nose piece 26 will be pressed downwardly towards the base part of the channel. When the slide 29 is moved rearwardly the gripping member may turn so that the nose piece 26 moves away from the base portion of the channel.

A rod 31 is fastened to the rear end of the slide and said rod fits slidably within an axial opening in the ferrule 18 at the rear end of the channel. The slide is held against incorrect movement by both the guides 22 and the rod 31.

A helical compression spring 32 is fitted about the rod 31 so as to be adapted to urge the slide 29 forwardly, and said slide may be moved slidably rearwards against the pressure of the spring by applying pressure to a finger piece 33 connected to said slide. This finger piece is secured to a short rod 34 which is fastened to the slide 29, the rod 34 fitting through a slot 35 formed in the base of the body member 11. This finger piece 33 preferably consists of a moulded insulating member and the short rod 34 is rotatable relative to the slide 29.

Figure 3:
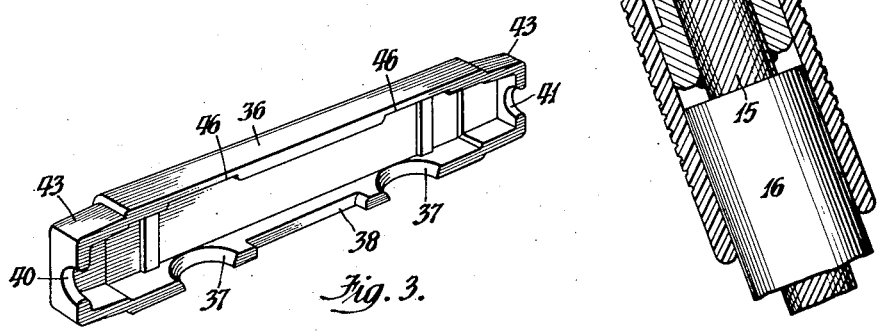
Fig. 3 illustrates the design and construction of one part of the reversible cover.

The body 11 of the electrode holder is enclosed or encased in a cover made of insulating material. The insulating cover consists of two substantially identical members 36 as illustrated in Fig. 3, which fit about the body member 11 so as to prevent inadvertent finger contact with the metal of the body.

It is a feature of the invention to provide two similar cover members 36 made so that they may be fitted together to encase the body portion 11 and adapted to be reversed in position—or turned end for end—relative to the body portion. To this end, each cover member 36 has in its lower side two spaced-apart semi-circular openings 37 with a longer, narrower opening or recess 38 between them. These openings are so formed that when the two cover members 36 are fitted together the intermediate opening 38 will register with the slot 35 in the bottom of the body member 11, an opening 37 at one end will accommodate the stem portion 12 near one end of the body 11, and the other end opening 37 will be blank. The plug 39 depicted in Fig. 9 is fitted into the two registering blank end openings 37 so as to close them. If the two cover members be disengaged from the body, turned end-for-end and replaced, then the second-mentioned end opening (previously closed by the plug 39) will accommodate the stem portion 12 near one end of the body 11 and the first-mentioned end opening 37 will be blank—the plug 39 may be fitted in these latter openings 37 to close them.

Figure 4:
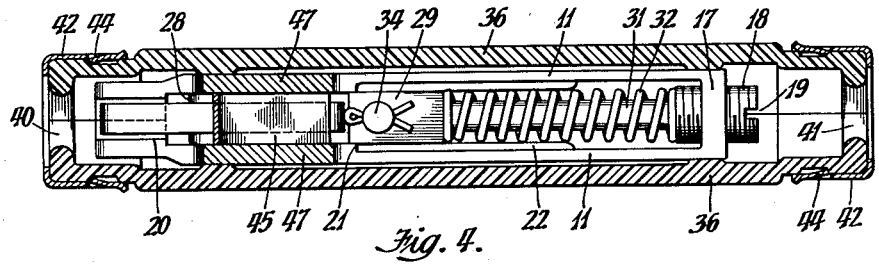
Fig. 4 is a cross-section taken on the plane indicated by the line, and in the direction of the arrows, 4—4 of Fig. 2.

There are openings 40, 41 in the opposite ends of the composite cover—the opening 40 to accommodate the electrode A and the opening 41 to permit the insertion of a screw-driver so as to adjust the position of the ferrule 18. The two parts of the cover are held together by ferrules or caps 42, the opposite ends of the cover members 36 being reduced or stepped inwardly at 43 and the cap pieces being adapted to slip over those reduced end portions. The cap pieces have indentations 44 which engage in corresponding recesses in the end portions of the cover—see Fig. 4.

In order to ensure that the electrode gripping member 24 will turn pivotally, when the slide 29 is retracted by finger pressure applied to the finger piece 33, so that the nose piece 26 is opened or moved away from the seating 23, I provide the spring 45. One arm of this spring presses upon the tail piece 27 of the member 24 and the other arm is accommodated in recesses 46 provided in the cover members 36 so that the spring is held against linear movement relative to said member 24. The spring 45 is held correctly centralised on the member 24 by means of two lugs 47 formed integrally with the side walls of the body 11—see Figs. 2, 4, 5. It is apparent that this spring must be capable of moving freely between the side walls of the channel-shaped body member 11 if it is to operate effectively to press the tail piece of the electrode gripping member 24 downwardly when the slide 29 is retracted.

Fastened to the boss 13 at the rear end of the body member is a handle 48 of substantially cylindrical tubular shape. This handle is made of a suitable insulating material—as phenolic resin impregnated paper—and it is grooved to provide a suitable hand grip. The handle 48 is a relatively neat fit on the boss 13 so that it may be removed when necessary and readily replaced. It is secured in position by means of a grub screw 49 which fits through a hole in the wall of the handle and engages in a tapped hole provided in the boss 13. The screw 49 is made of insulating material—as fibre—so as to ensure no electric current will be conducted from the boss to the hand of the person using the electrode holder. The upper end of the handle 48 is shaped so that it fits partially about the underside of the cover members 36 and it thereby assists in holding said members in position.

The parts of the electrode holder are so arranged that the handle 48 may be conveniently gripped in one hand and when it is desired to move the slide 29 rearwardly one or two of the fingers of that hand may be used to grip about the finger piece 33. By application of a squeezing pressure by that hand the slide 29 may be moved rearwardly against the pressure of the spring 32. In the rearward movement of the slide 29 the gripping pressure of the electrode gripping member 24 upon the electrode A is released—due in part to the action of the spring 45—so that the electrode may be readily removed from the end of the electrode holder and a fresh electrode put in its place. Then, when the pressure upon the finger piece 33 is released the slide 29 will be urged forwardly again by the spring 32, and when said slide moves forwardly the electrode gripping member 24 will be caused to turn pivotally so as to tightly grip the new electrode in the holder. The extent of movement of the slide 29 is determined by the length of the slot 35 in the base of the channel shaped body 11. The parts of the electrode holder are so constructed and arranged that the electrode gripping member 24 will be adapted to grip tightly all the electrodes of a predetermined range of sizes—as from $\frac{1}{16}''$ to $\frac{5}{16}''$ diameter.

If a number of electrodes be placed on a bench or other support so that their ends project beyond the edge of the bench then the electrode holder may be readily held in and operated by one hand to release the stub of a used electrode and to pick up and grip another electrode.

The ferrule 18 may be turned when it is desired to adjust the effectiveness of operation of the electrode gripping member 24. When the ferrule 18 is turned relative to the body 11 the pressure of the spring 32 will be altered—either increased or decreased (depending upon the direction in which the ferrule 18 is turned)—so as to increase or decrease the pressure of the nose piece 26 of the member 24 upon the electrode. Thus, if the holder be used for holding electrodes of 5/16" diameter it may be found desirable to reduce the pressure of the spring 32 so as to make it easier to operate the trigger. But if, then, it be desired to use the holder with an electrode of 1/16" diameter it may be found necessary to increase the pressure of the spring 32 so as to ensure that the electrode will be held firmly in the electrode holder.

What I claim is:

1. A welding electrode holder having a body member, a handle attached to the body member at an angle thereto, an electrode gripping member pivotally mounted on the body member, a wedge-shaped slide member linearly movable in the body member and having one end adapted to engage with and cause the electrode gripping member to turn pivotally, a rod connected to said slide member and extending rearwardly through an opening in the rear end of the body member, a compression spring fitted about said rod, a ferrule screwed into and exposed at the rear end of the body member, the rod being engaged slidably in said ferrule and the latter being capable of adjustment so as to effect adjustment of the pressure of said spring, and a trigger connected to said slide member for actuation thereof to release the electrode gripping member, the handle and trigger being so arranged that when the handle is held in one hand the trigger may be actuated by that hand.

2. A welding electrode holder having a body member, a handle attached to the body member at an angle thereto, a cover of insulating material fitted on said body member, said cover comprising two substantially identical members capable of being removed from the body member and being replaced thereon in reversed end to end fashion, an electrode gripping member pivotally mounted on the body member, and a trigger actuatable to release the electrode gripping member, the handle and trigger being so arranged that when the handle is held in one hand the trigger may be actuated by that hand.

3. A welding electrode holder as claimed in claim 2, wherein the cover has in its underside a longitudinal slot corresponding to a longitudinal slot in the underside of the body member and a hole in each of the opposite ends of the slot, one hole accommodating a stud integral with the body member.

4. A welding electrode holder as claimed in claim 3, wherein there is a plug fitted into the other said hole in the cover, the plug being removable when the cover is turned end for end.

5. A welding electrode holder having a body member, cover members and a handle fitted thereto, an electrode gripping member mounted pivotally within the body member, spring means biasing said gripping member to open position, a slide mounted within the body member so as to be movable linearly therein and adapted to actuate the electrode gripping member to closed position, a spring mounted within the body member and adapted to press the slide forwardly in engagement with the electrode gripping member, and a finger piece connected to the slide.

6. A welding electrode holder as claimed in claim 5 wherein the covers are reversible in end-to-end manner.

7. A welding electrode holder as claimed in claim 5 wherein there are means for adjusting the pressure of the spring acting on the slide.

8. In a welding electrode holder of pistol-grip type, a cover of insulating material completely encasing the barrel portion of such holder from which an electrode gripped thereby extends, said cover comprising two complementary longitudinal sections which are readily detachable from the holder and formed symmetrically lengthwise, whereby said cover is reversible end-to-end on the barrel portion.

9. A welding electrode holder claimed in claim 8 wherein end caps are fitted on the respective ends of the cover to hold the longitudinal sections thereof together.

References Cited in the file of this patent
UNITED STATES PATENTS

| | | |
|---|---|---|
| 1,211,009 | Thornton | Jan. 2, 1917 |
| 2,148,095 | Yettner | Feb. 21, 1939 |
| 2,150,464 | Smith | Mar. 14, 1939 |
| 2,357,529 | McKellar | Sept. 5, 1944 |
| 2,358,800 | Fuller | Sept. 26, 1944 |